United States Patent [19]

Stevenson

[11] Patent Number: 5,668,800
[45] Date of Patent: Sep. 16, 1997

[54] PATH TESTING IN COMMUNICATIONS NETWORKS

[75] Inventor: John George Stevenson, Raleigh, N.C.

[73] Assignee: International Business Machines Corporation, Armonk, N.Y.

[21] Appl. No.: 236,800

[22] Filed: May 2, 1994

[51] Int. Cl.$^6$ ................................................. H04J 3/14
[52] U.S. Cl. ........................ 370/248; 370/249; 370/250; 370/252
[58] Field of Search ........................ 370/13, 14, 15, 370/13.1, 16, 17, 60.1, 79, 84, 216, 217, 218, 229, 235, 236, 241, 242, 244, 248, 249, 250, 252; 379/1, 5

[56] References Cited

U.S. PATENT DOCUMENTS

| | | | |
|---|---|---|---|
| 4,866,704 | 9/1989 | Bergman | 370/85.4 |
| 5,276,440 | 1/1994 | Jolissaint et al. | 340/825.02 |
| 5,477,536 | 12/1995 | Picard | 370/54 |
| 5,563,875 | 10/1996 | Hefel et al. | 370/15 |

Primary Examiner—Russell W. Blum
Attorney, Agent, or Firm—Jerry W. Herndon

[57] ABSTRACT

A packet communications network includes both packet switched and circuit switched transmission links. A path test command launched from a source resource on the network to a destination resource follows a current path from the source to the destination. At each resource, the path test command initiates a process which identifies the next resource in the path, the port of the current resource through which the next resource is accessed, and the current time. This data is returned to the source resource where the data is accumulated for the entire path and then analyzed to determine the location of failed links, if any, the response time from the source to the destination, the response time of each resource in the path, and the location of congested links. Packet switched resources identify the path test command themselves and carry out the testing procedure. Circuit switched resources utilize the control point controlling that resource to carry out the testing procedure.

26 Claims, 7 Drawing Sheets

PATH TESTING IN COMMUNICATIONS NETWORKS

TECHNICAL FIELD

This invention relates to communications systems and, more particularly, to methods and apparatus for testing individual communications paths in such systems.

BACKGROUND OF THE INVENTION

U.S. Pat. No. 5,276,440, issued Jan. 4, 1994, to C. H. Jolissaint et al., and assigned to applicants' assignee, a system is described in which each and every device in a communications network reports its physical connections to other devices to a centralized network manager. The network manager uses this information to maintain a topological data base which, in turn, can be used to analyze error reports to determine the location of device failures. This prior art system is very useful for error detection and correction in the physical network, but is of limited value for identifying and evaluating one or more communication paths through the network.

In order to fully analyze the performance of a transmission network, it is necessary to be able to trace and test the path of each connection through the network. These connections may be fixed, manually changed, or dynamically altered. The resources that make up such paths through the network are of two types, packet switched resources and circuit switched resources. Packet switched resources determine the path through which the data is transmitted by looking at the information being transmitted. These packet switched resources are typically connected together to form networks controlled by protocols such as the Open Systems Interconnection (OSI) systems, Traffic Control Point/ Interconnection Protocol (TCP/IP), X.25, IBM's Systems Network Administration (SNA), Digital Equipment Corporation's DECnet, and so forth. Circuit switched resources, on the other hand, establish the path through which the data is to be transmitted before the data is transmitted, and do not look at the information being transmitted. Circuit switched resources can also be connected together into networks using, for example, Multiplexors, Private Branch Exchange/ Central Branch Exchange (PBX/CBX) private telephone circuits, the Public Switched Network (PSN), data modems, Customer Service Units (CSUs), and so forth. Indeed, typically packet switched resources and circuit switched resources are combined into a single network. In such a complex network, it is very difficult to determine the actual resources which are used to make up any particular connection or path. Moreover, the network can dynamically change the path without the knowledge of the end user or the host computers.

When a problem is encountered in a complex network, for example, if the end user's response time changes by an order of magnitude from day to day, it is very difficult to determine what the actual active path through the network is at any given time. The ability to determine the actual path, however, is critical to determining the cause of the problem. The normal preferred path, for example, might be dynamically altered due to a failure in one of the resources and cause a radical change in the properties of the overall connection. Without a detailed knowledge of the constituent resources in the path, such changes in performance are impossible to explain or correct.

Unlike the prior art system of U.S. Pat. No. 5,276,440, which reports the physical interconnections between all of the resources, it is desirable to string together only the interconnections of those resources included in a particular data connection, and to do so only on request. Determining which of the available resources are involved in a particular connection at a particular time is itself a very difficult problem. Testing only those resources involved in a particular connection at a particular time is an even more difficult problem. This problem is exacerbated when there are many different packet networking protocols used in the communication path, some of which may be encapsulated inside of other networking protocols. It is not, feasible for each protocol to look into another protocol.

SUMMARY OF THE INVENTION

In accordance with the illustrative embodiment of the present invention, the ability of the prior art resource connection reporting mechanism of U.S. Pat. No. 5,276,440 is utilized to implement a path testing facility. The path testing facility takes the form of a path test command issued by an originating resource at the origin of the path. The path test command is launched on the network, following the path of normal data transfer to the normal destination resource. At each resource encountered along the connection path, the path test command initiates a path test identifying that resource, the port of that resource connected to the next resource in the connection path, and the current time. Since there are two forms of resources, packet switched resources and circuit switched resources, there are also two forms of the path test command (PTC), one for packet switched resources and one for circuit switched resources at the physical level.

In packet switched resources, the resource looks at each data packet and recognizes the unique PTC packet with a field identifying it as a path test command. In response to the path test command, the packet switched resource initiates a wrap-around test to the next packet switched resource in the network having an OSI protocol layer at the same level. At the same time, the resource initiates a physical layer path test for the outgoing leg of the transmission path. The packet switched resource reports the results of the wrap around test to the resource originating the path test command. As the path test command encounters another packet switched resource along the path, the path test command continues to the last resource in the path. Eventually all of the packet switched resources in the path report the results of the path test command to the next packet switched resource at the same level back to the originating resource.

If there is a protocol transformation at a resource, for example, a conversion from SDLC to X.25, then a new path test command is initiated for the new protocol. Indeed, each time there is a protocol transformation, a new path test is initiated. This solves the problem of encapsulated protocols inside of other network protocols.

When the path test command reaches the destination resource, it is returned to the originator. In the process, all of the resources in the path between the origin and the destination are tested, each packet switched resource along the path identifying itself, the next resource in the path, the port through which the next resource is connected, and the current time. Each circuit switched resource along the path is controlled by a packet switched resource which recognizes the path test command, identifies the resource to be tested, the next resource in the path, the port of that resource used in the path, and the current time. In both cases, the information is sent back to the originator of the path test command. It is assumed, of course, that the supplier of each transmission leg has already implemented a wrap around test of that transmission leg and the path test command must merely call upon that existing testing capability. The results of all of the physical level wrap around tests are also reported back to the resource initiating the path test command.

The above-described process is repeated while the path test command traverses the path in the return direction back to the originating resource. Thus, the resource information is collected for both directions of transmission to determine if different paths are taken for the two directions of transmission. The time stamps are used to determine such parameters as the response time of the entire path from source to destination, the response time of each resource in the path, to identify the resource which is causing congestion in the path, and, in case that the destination resource is never reached, to identify a resource which has failed and terminated the path connection.

It can be seen that the path test command serves to test actual transmission paths in a connection between a source and a destination. With this information in hand, path analysis can be accomplished to identify response time problems, to identify congestion problems or to determine the location of a path failure by noting the last resource able to perform the path test successfully. The results of such analysis can, in turn, be used to manage the network appropriately.

In accordance with one feature of the present invention, the path test command can be used to test an active path between a selected source and a selected destination, all of the possible paths between a source and a destination, or a specific path between the source and the destination.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
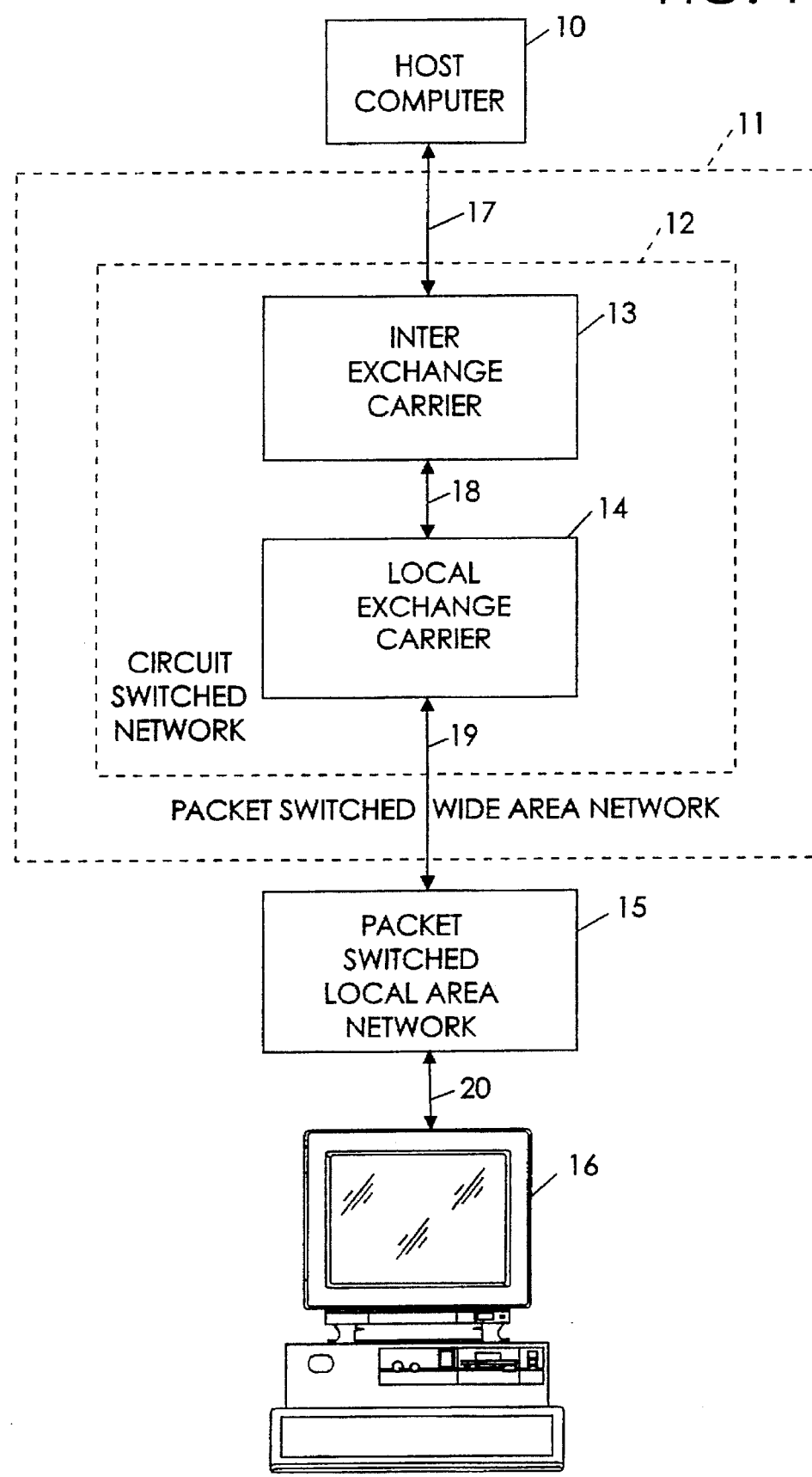
FIG. 1 shows a general block diagram of packet transmission network of the type in which the path identification and testing scheme of the present invention might find use; and showing a typical connection path through the network.

Referring more particularly to FIG. 1, there is shown a general block diagram of a data packet communications network 11 through which a host computer 10 communicates with a programmable user workstation 16. The packet network 11 of FIG. 1 is a packet switched wide area network (WAN) which, in turn, includes a plurality of different transmission facilities such as interexchange carrier 13, comprising switched circuit facilities, and local exchange carrier 14, also comprising switched circuit facilities. Local area network (LAN) 15 comprises packet switched transmission facilities. The path through network 11 from computer 10 to user workstation 16 therefore includes a mixture of packet switched and circuit switched facilities. Moreover, neither the user nor the host computer 10 has control over the particular facilities chosen to make up the transmission path. Interexchange carrier 13, for example, supplies a transmission link between two points, but is free to assign whatever physical facilities it wishes to this transmission link. A typical connection path through the network of FIG. 1 is represented by links 17, 18, 19 and 20 interconnecting the resources in the network of FIG. 1.

The management of a network such as that shown in FIG. 1 requires knowledge of all of the resources currently active in the network and their interconnection. Typically, the information concerning all of the resources in such a network is stored in a topology data base. In order to analyze data paths through the network, information concerning only those resources in the data path are required. This information must be available at the time the path is being used and must be available on demand. It is the provision of a mechanism to obtain such path information which forms the subject matter of the present invention.

Figure 2:
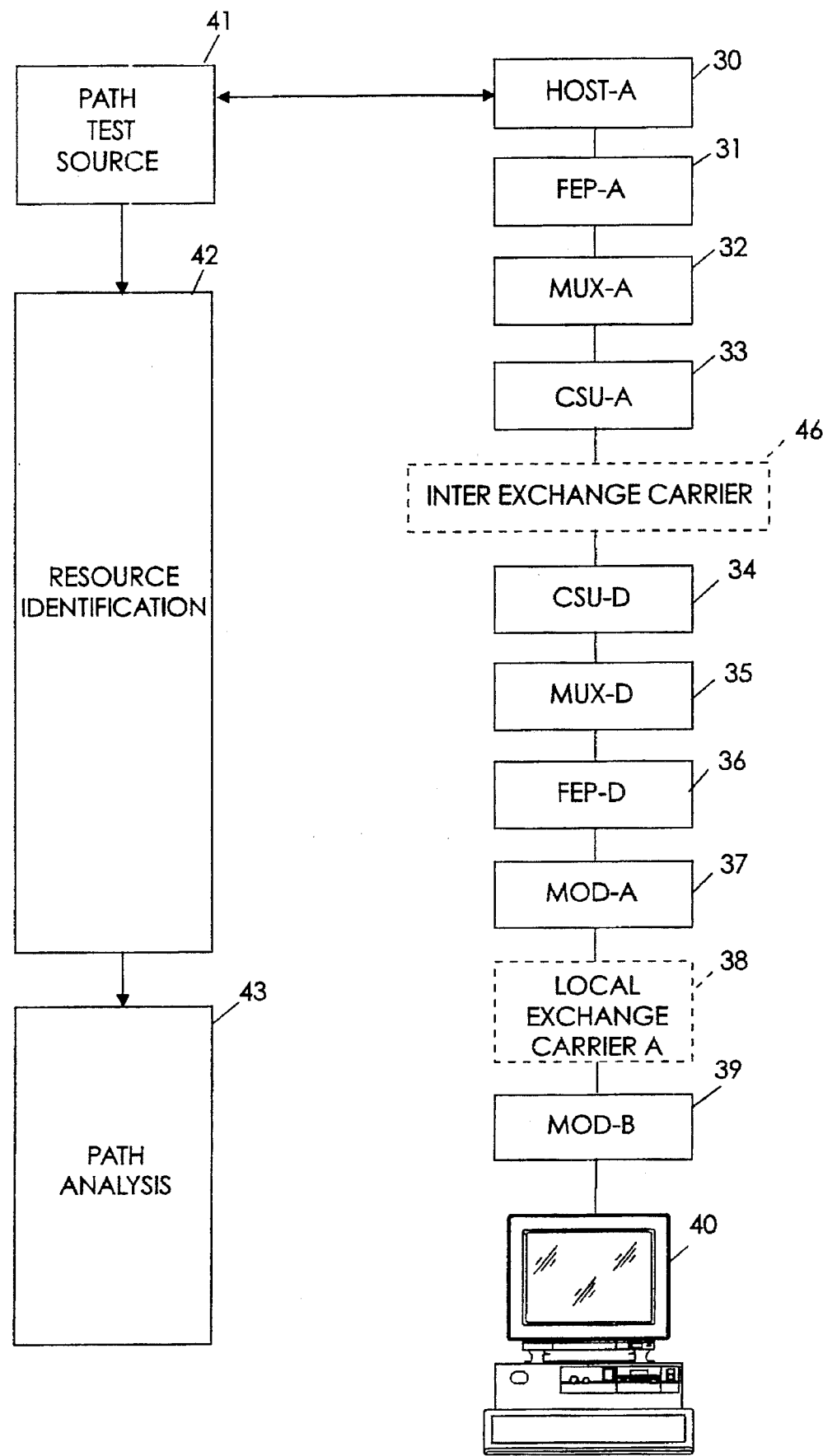
FIG. 2 shows a more detailed block diagram of the details of a portion of a particular transmission path through the network of FIG. 1, showing the routes of the path test commands and responses.

Referring then to FIG. 2, there is shown a more detailed block diagram of a portion of a transmission path through a packet network such as that shown in FIG. 1. This path extends from host computer 30 to a programmable workstation 40. Included in this path are a from end processor (FEP) 31, a multiplexor 32, a customer service unit (CSU) 33, inter-exchange carrier system 46, a customer service unit (CSU) 34, multiplexor 35, front end processor (FEP)36, data modem 37, local exchange carrier 38, and data modem 39. A path test source 41 can issue the path test command for testing the path from host 30 to workstation 40. Resource identification process 42 receives the path test data returned from each of the resources in the path between host 30 and workstation 40 while path analysis process 43 analyzes the path test data for failures, congestion and times of response.

The resources in the path from host 30 to workstation 40 include both packet switched resources and circuit switched resources. The packet switched resources include host computer 30, front end processor 31 front end processor 36 and workstation 40. The circuit switched resources include multiplexors 32 and 35, customer service units 33 and 34 data modems 37 and 39, inter-exchange carrier system 46 and local exchange carrier system 38. Most of the circuit switched resources form matching pairs of resources forming matched transmitting and receiving resources. Multiplexors 32 and 35, for example, form such a pair while CSUs 33 and 34 and modems 37 and 39 form other pairs.

Figure 3:
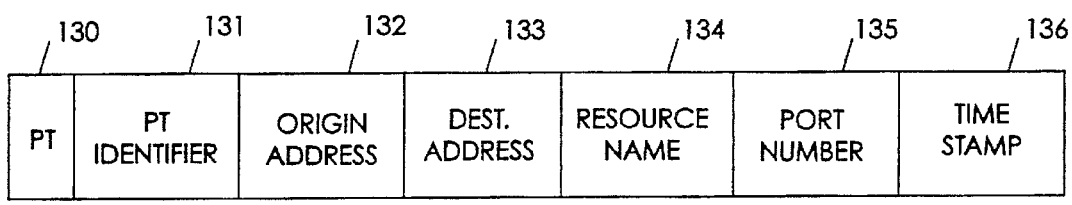
FIG. 3 shows a graphical representation of a typical path test command format in accordance with the present invention.

Before proceeding with the description of FIG. 2, the path test response formats will be discussed in connection with FIGS. 3 and 4. In FIG. 3 there is shown a graphical representation of the path test format for wrap around tests. The format of FIG. 3 comprises a plurality of fields. In field 130 is the unique identifier of the path test command which allows resources along the path to recognize this packet as a path test command. Field 131 contains a unique identifier of this particular path test, since it is possible for a plurality of different path tests to be in progress simultaneously, using the same resources. Field 132 contains the address of the resource which initiated this path test command. This address is required by the resources along the path to identify the resource to which the path test results are to be returned. Field 133 contains the address of the path destination resource, required to identify the end of the path being tested and allow return of the path test command to the originating resource. Field 134 contains the name of the resource initiating the test; field 135 identifies the port of the resource in field 134 connected to the next resource in the path; and field 136 contains a time stamp identifying the time at which the test was carried out. The path test command of FIG. 3 is launched on the network at the tested resource and traverses the network back to the originating resource.

Figure 4:
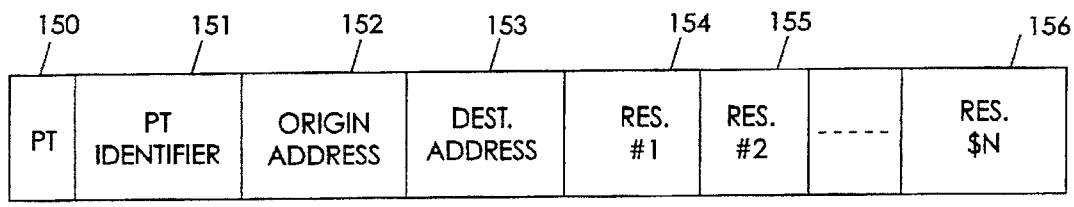
FIG. 4 shows a graphical representation of a typical path test command response in accordance with the present invention.

FIG. 4 shows a graphical representation of a typical path test response which is returned from each resource in the path back to the originating source of the path test command. The response of FIG. 4 also comprises a plurality of fields 150 through 156 corresponding to fields 130 through 136 in FIG. 3 containing a unique identifier of this packet as a path test response packet (field 150), a unique path test identifier (field 151), the originator address (field 152), which allows this response to be routed back to the originator resource, and a field identifying the destination resource (field 153). Since the packet switching resource responses can be packaged together into a single response, the response format of FIG. 4 includes information concerning a plurality of resources 154, 155, . . . , 156. Each of fields 154-156 includes three subfields corresponding to fields 134-136 of FIG. 3. That is, each resource reports its resource name, port number for the connection to the next resource in the path, and a time stamp.

Returning to FIG. 2, once data concerning all of the resources in a particular path is returned to resource identification process 42 (as indicated by the reception of path test information from the destination resource), this information is passed on to path analysis process 43. In path analysis process 43, the resource information is analyzed to identify any path response time problems, resource congestion problems and the cause or location of a path being down. To accomplish these ends, path analysis process 43 analyzes the time fields returned by the different path test responses. Using the time that the path test was initiated as a time base, the time it takes for each resource to respond, both on the transmit leg and on the receive leg of the path, can be used to identify congestion and path delay problems. If any errors are detected by path analysis process 43, the cause of the problem and the last resource able to perform the path test successfully are noted to locate the error and pinpoint the resource to be replaced or repaired.

Figure 5:
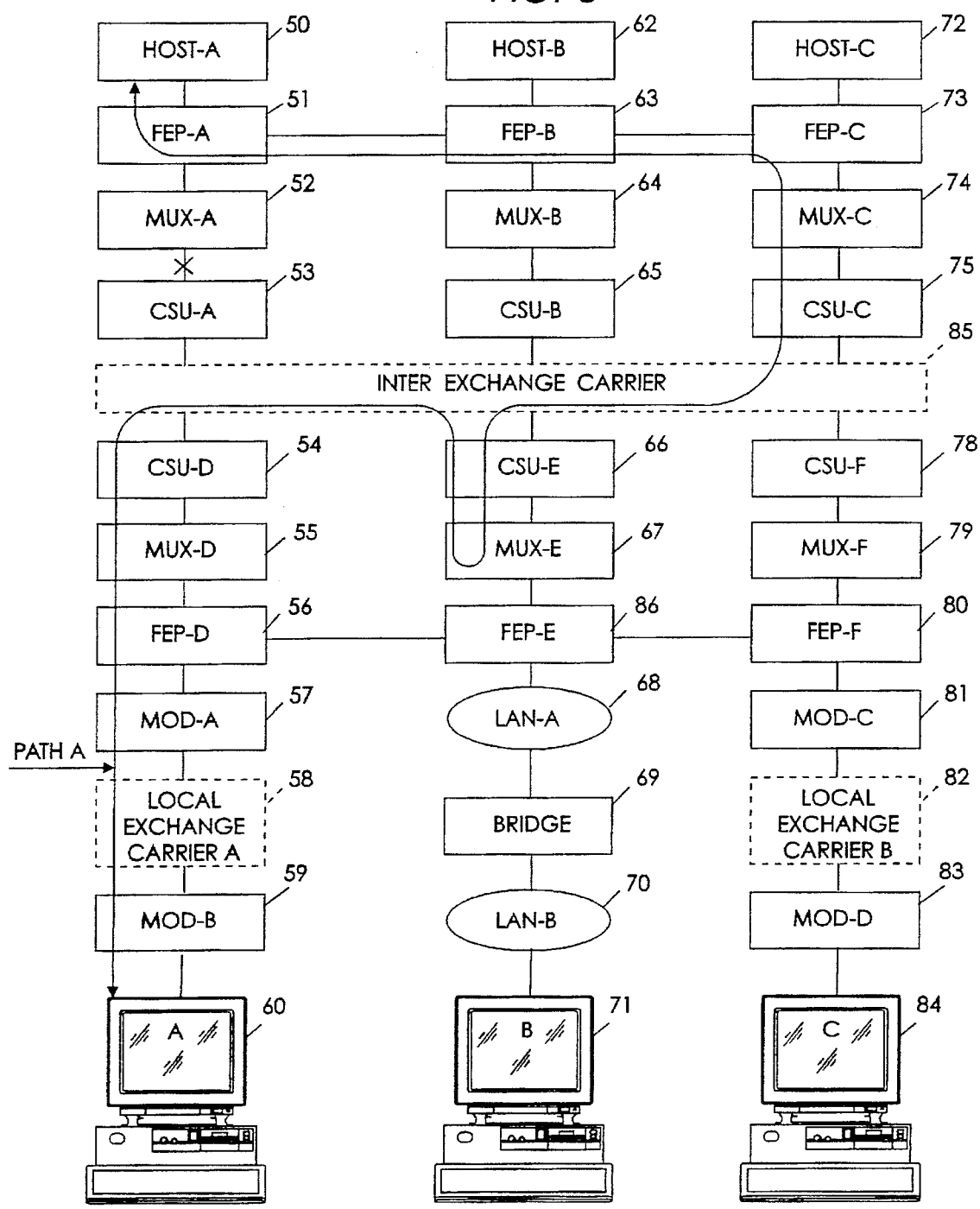
FIG. 5 shows a block diagram of the details of a plurality of transmission paths through the network of FIG. 1, showing the manner in which such a path can change dynamically in response to changes in the availability of resources in the network.

In FIG. 5 there is shown a block diagram of several paths through the transmission network of FIG. 1 showing the possible dislocation of a path due to failures of resources in the system. In FIG. 5, three paths initially exist between host 50 and workstation 60, between host 62 and workstation 71 and between host 72 and workstation 84. It can be seen that a failure in the path between host 50 and workstation 60, and particularly between multiplexor 52 and customer service unit 53, results in a new transmission path A between host 50 and workstation 60. Moreover, this new path will have significantly different properties from the properties of the original transmission path. It is a very difficult technical problem to identify this new transmission path, much less measure the transmission properties of each resource in the new path. It is towards the solution of this difficult technical problem that the present invention is directed.

Figure 6:
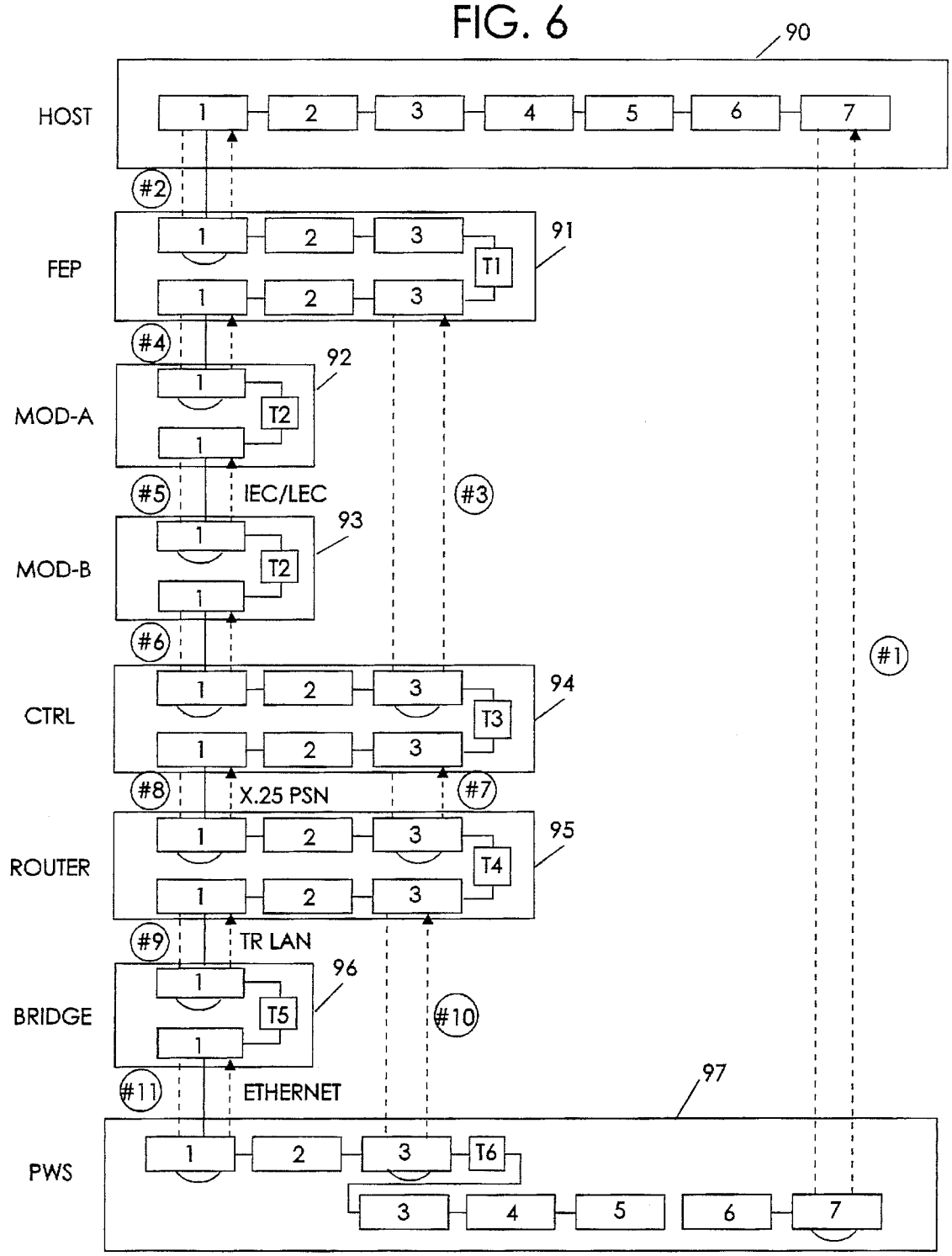
FIG. 6 shows a detailed block diagram of one of the transmission paths shown in FIG. 1 showing the multiple protocol levels in each resource in the path and showing the inter-resource wrap around path tests in accordance with the present invention.

To better illustrate the operation of the path test procedure of the present invention in a path containing multiple layers of networking protocols, a more detailed block diagram of another typical path through the network of FIG. 1 is shown in FIG. 6. In particular, FIG. 6 shows the various protocol layers defined in the Open System Interconnections (OSI) model disclosed in "Information Processing Systems—Open Systems Interconnection—Basic Reference Model," *ISO International Standard* 7498, First Edition, Oct. 15, 1984. It will be recalled that the lowest layer, layer 1, of the OSI protocol system is the physical layer which provides the actual connection across a physical transmission medium between two nodes of the network of FIG. 1. Such physical connections are made by way of electrical or optical signals propagating on the physical medium between the two nodes in accordance with any well known transmission protocols. These physical layer transmission protocols define the signal pulse shapes, pulse repetition rates, pulse amplitudes, and so forth. The next higher OSI layer, the data link control layer, controls the delivery of raw data between the nodes of the network. Layer 2 protocols include link identification, synchronization, error correction, packet sizes, framing and so forth. In most networks, fundamental communication errors are detected and corrected at the data link control layer 2.

The next higher OSI protocol layer above data link control layer 2 is called the network layer 3. The network layer 3 is the highest layer of the communications network node, meaning that all layers above layer 3 communicate with each other on an end-re-end basis while the network layer 3 and all layers below the network layer 3 control communications on a per link basis between nodes of the network of FIG. 1. The network layer 3 protocols control the routing of information through the network, packet addressing, network initialization, packet switching, as well as segmenting and formatting of the information. These network layer 3 functions can be realized by using an international communications standard which prescribes the interface between a public packet-switched network and a private communications system such as those described in ISO/DIS 10598 and ISO/DIS 10589.

The next higher OSI protocol layer, layer 4, is called the transport layer and controls the transparent data transfer, end-to-end control, multiplexing, data mapping, and so forth. Data delivery to the transport layer may, for example, imply reliable data reception or may imply only best efforts to deliver the data. Indeed, classes of reliability and delivery options may be selected at will by the user.

The next higher OSI protocol layer, layer 5, is called the session layer and operates to group pieces of information received from the transport layer 4 into multi-packet groups associated with a given logical layer activity which can be referred to as a session. Sessions can exist between any two entities at any location in the network. Indeed, at any given time, a single node in the network can be involved in multiple sessions going to many other nodes, and many sessions can be multiplied over the same network links. The session layer 5 provides end-to-end coordinated delivery of data to a given logical activity without interference by data from other logical activities, even at the same layer 3 of the system.

The next higher OSI protocol layer above the session layer 5 is called the presentation layer 6. The presentation layer 6 protocols interface the session layer 5 to the application layer 7, presenting data to the application layer in a format suitable for use by the application layer 7 without compromising the integrity of the session layer 5 functions. The presentation layer 6 provides data interpretation, format and code translation, and so forth. The highest layer, layer 7, is the application layer and interfaces the user application with higher level system management functions not part of the OSI protocols.

It can be seen that communication between two different users at a source node and a destination node of a packet communications network involves the use of up to seven layers of protocol. Each of the seven layers is isolated from the others but meets interface standards that allow each layer to communicate with the adjacent layers. This layered approach permits the implementation of the individual layers to be flexible while at the same time providing the same standard functionality and insuring inter-layer communications can take place. Communication between the source node and the destination node is thus made possible by communication between the seven layers of protocol of the ISO model, observing all of the inter-layer protocols.

The illustrative path shown in FIG. 6 contains multiple networking protocols between host 90 and programmable workstation (PWS) 97. The illustrative resources included in this path, from top to bottom, include host 90 (e.g., IBM System/390), front end processor (FEP) 91 (e.g., IBM 3745), a modem (MOD-A) 92 (e.g., IBM 5862), a interexchange and/or local exchange (IEC/LEC) carrier (e.g., MCI/Southern Bell), another modem (MOD-B) 93, a controller (CTRL) 94 (e.g., IBM 3174), an X.25 public switched network (PSN), a router 95 (e.g., IBM 6611), a token ring local area network (TR LAN), a bridge 96 (e.g., IBM DOS TR Bridge), an ETHERNET local area network, and the programmed workstation (PWS) 97 (e.g., IBM PS/2). Not all of these resources support all of the seven levels of protocols defined in the OSI standard. In order to implement the path test command in the environment of FIG. 6, the following procedures are followed:

A path test #1 is transmitted from the originating resource (host 90) to the destination resource (workstation 97) at the network protocol layer 7. This is an end-to-end test and will identify all resources in the path that support level 7 protocols. In FIG. 6, only host 90 and workstation 97 support the level 7 protocols.

The layer 1 protocol in each resource in the path is notified to run a wrap test to the next adjacent resource, using the same path test identifier as was used in the layer 7 test.

Every protocol transformation in the normal data path will invoke an additional path test, using the new protocol's path test and including the same test identifier.

The results from all tests are returned to the originator of the path test command.

As before, the originator of the path test will analyze the test results to identify problems in the path.

Applying this procedure to the illustrative path in FIG. 6, an operator at the host 90 initiates a path test command having a command identifier PATH_TEST, a test identification TEST_ID=TESTA, an originator address field OAF= HOST90, and a destination address field DAF=PWS97. The OAF field identifies the resource to which all test results are returned. The DAF field identifies the last resource in the path to be tested and hence terminates the path test command forwarding procedure.

More particularly, in FIG. 6 eleven different path tests are used in the path test illustration, identified as test #1 through test #11. The overall effect of these test are shown below:

Test #1 identifies host 90, FEP 91 and workstation 97.

Test #2 identifies host 90 and FEP 91.

Test #3 identifies FEP 91 and controller 94.

Test #4 identifies FEP 91 and modem 92 (MOD-A).

Test #5 identifies modem 92 (MOD-A) and modem 93 (MOD-B).

Test #6 identifies modem 93 (MOD-B) and controller 94.

Test #7 identifies controller 94 and router 95.

Test #8 also identifies controller 94 and router 95.

Test #9 identifies router 95 and bridge 96.

Test #10 identifies router 95 and workstation 97.

Test #11 identifies bridge 96 and workstation 97.

It is clear that the path test responses to tests #1–#11 will provide adequate data to analyze the entire path from host 90 to workstation 97. Each protocol layer in the illustration of FIG. 6 implements the path test protocol appropriate for that protocol layer. Path test protocols can also be defined for the inter-exchange or local exchange carrier facilities between modems 92 and 93 and the X.25 public switched network between controller 94 and router 95, assuming that the operators of these facilities choose to implement these protocols.

Figure 7:
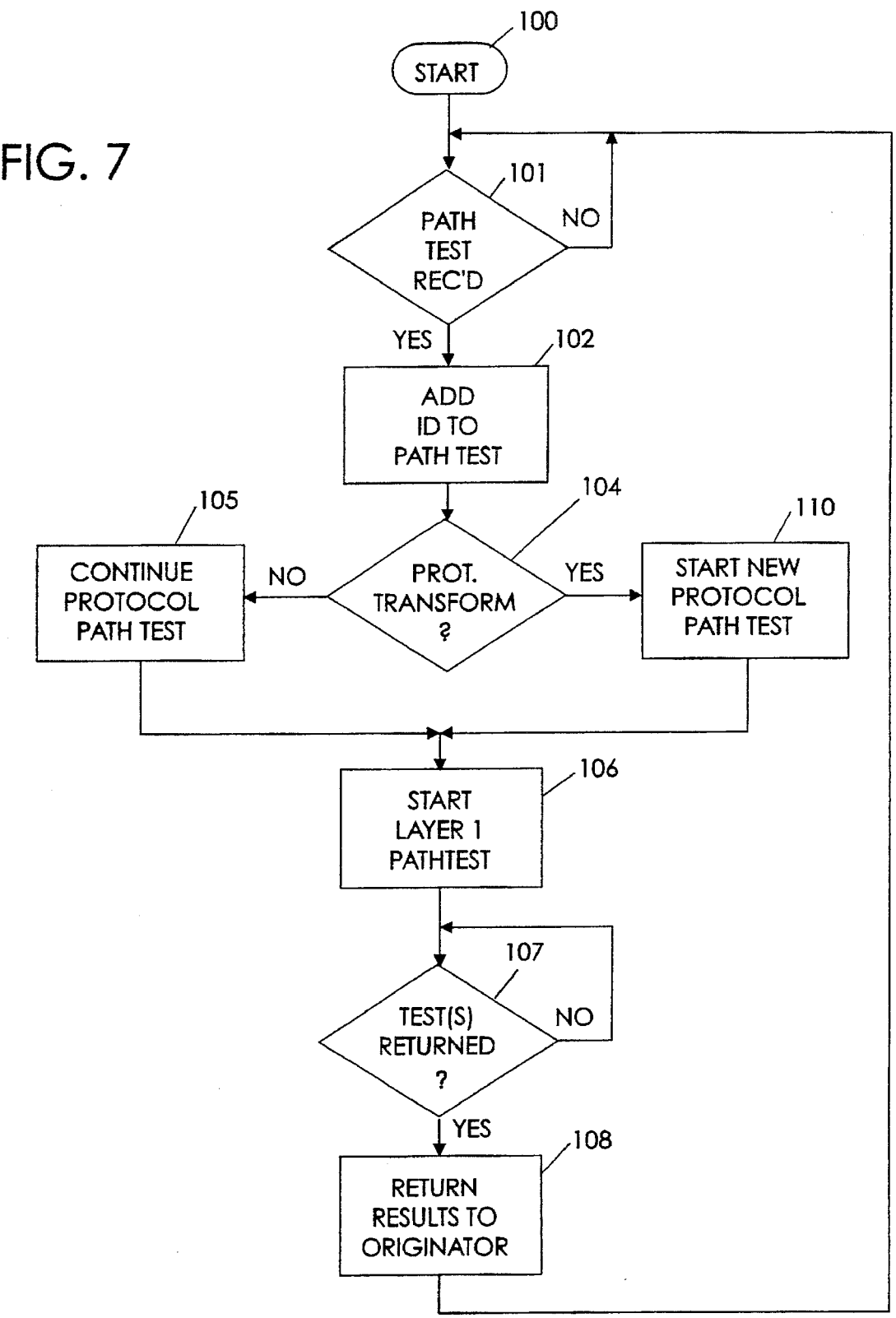
FIG. 7 shows a flow chart of the handling by each resource of the path test command received from a path test command initiating resource.

In FIG. 7 there is shown a flow chart of the procedure followed for each resource in the path being tested when the path test command is received by a resource or by a protocol transformation process in such a resource. Starting in start box 100, decision box 101 is entered to determine if a path test command has been received. If not, control is returned to the decision box 101 until a path test command is received. When decision box 101 detects the receipt of a path test command, box 102 is entered where the path test response is modified by adding the identification of this resource to the path test response in the name field 134 of FIG. 3 (or a corresponding subfield in FIG. 4). Decision box 104 is then entered to test whether or not a protocol transformation is required for the next leg of the path. If the protocol does not require transformation, box 105 is entered to continue the path test to the next resource in the path using the old protocol. Box 106 is then entered where the layer 1 path test (one of tests #2, #4, #5, #6, #8, #9 and #11 in FIG. 6) is initiated. Decision box 107 is then entered to await the return of the results from the layer 1 path test results. When these results are received, box 108 is entered to return the results of the path tests to the originator of the path test command (host 90 in FIG. 6). The procedure then recycles back to box 101 to await the next path test. If the protocol needs a transformation for the next leg of the path, as determined by decision box 104, box 110 is entered to change the protocol of the path test to a form suitable for launching on the next leg of the path. Thereafter decision box 106 is entered to start the layer 1 path test and the procedure continues as before.

Figure 8:
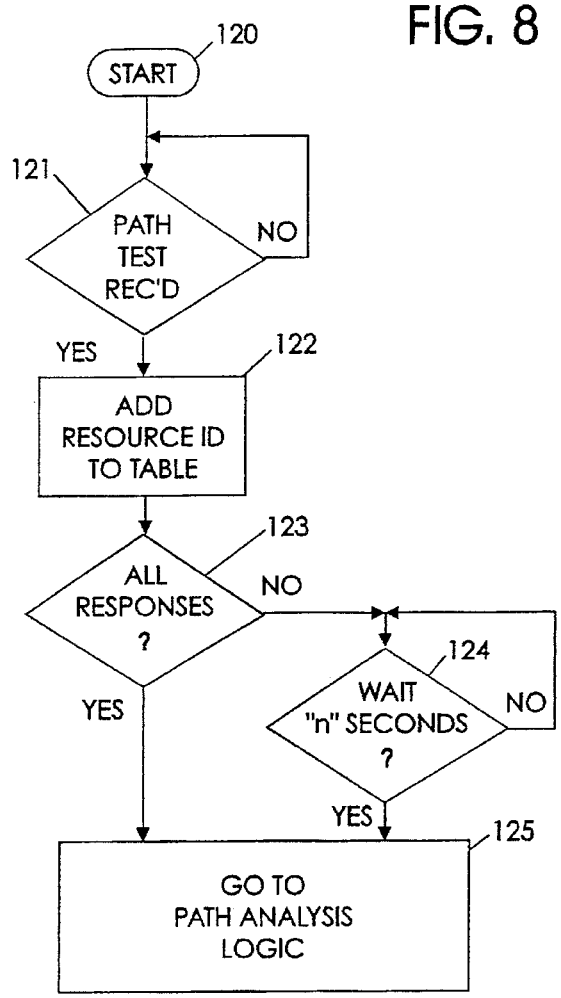
FIG. 8 shows a detailed flow chart of the resource identification logic used for the reception and correlation of the path test command response shown in FIG. 2.

In FIG. 8 there is shown a flow chart of the procedures taking place in resource identification process 42 of FIG. 2. Starting in start box 120, decision box 121 is entered to await the reception of path test results for the path test in progress. When the path test results are received, box 122 is entered to add the resource information to a resource table. Decision box 123 is then entered to determine if all of the path test results have been received. This is determined by noting whether or not a response has been received from the destination resource of the path under test. If all of the responses have been received, box 125 is entered where the path represented by the table is analyzed in path analysis process 43 of FIG. 2. This path analysis will be described in detail in connection with FIG. 9. If all of the responses to the path test command have not as yet been received, as determined by decision box 123, decision box 124 is entered where a time out of the path test responses is initiated. This time out ("n" seconds) is sufficiently long to insure that all of the responses should have been received, but yet sufficiently short to avoid undue delays in providing the path analysis to the user who initiated the path test command. If the time out occurs in decision box 124, path analysis box 125 is entered.

Figure 9:
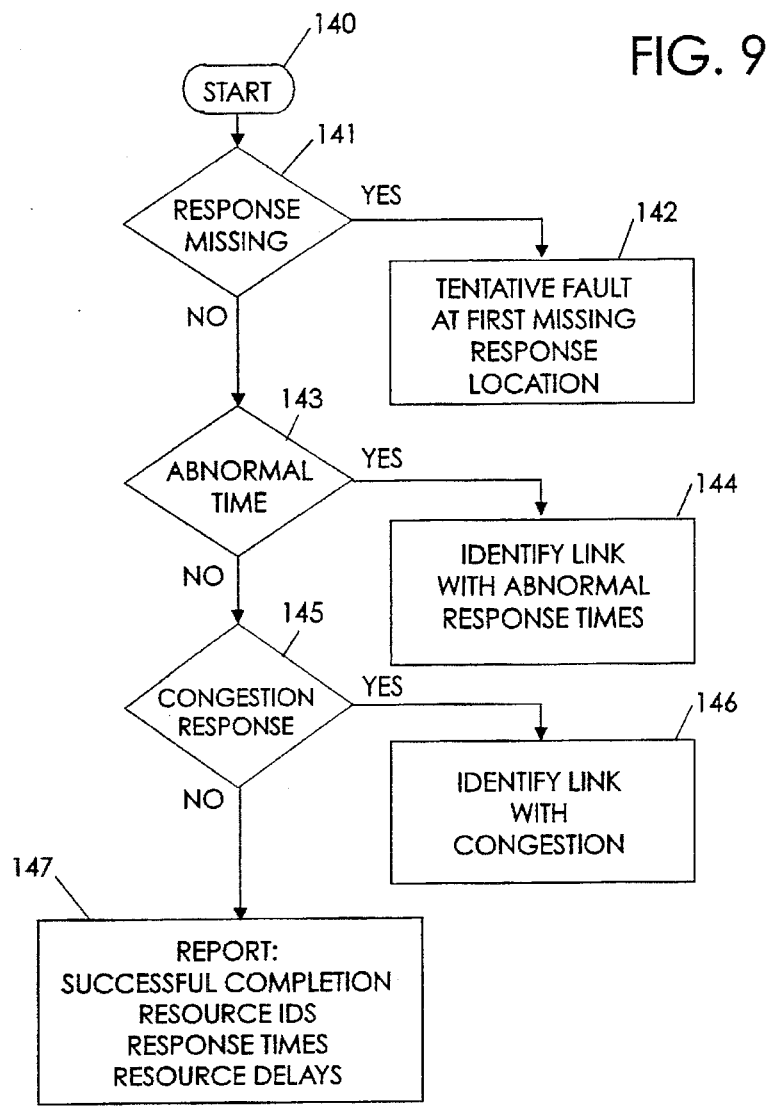
FIG. 9 shows a detailed flow chart of the path analysis block shown in FIG. 2.

In FIG. 9 there is shown a flow chart of the path analysis logic taking place in the path analysis process 43 of FIG. 2. Starting at start box 140, decision box 141 is entered where it is first determined whether or not a response is missing. That is, it is determined whether the responses represent a continuous path between the originating resource and the destination resource. If a response is missing, box 142 is entered where the path fault is tentatively located at the first missing response location. If no responses are missing, decision box 143 is entered where it is determined whether or not any of the resource response times is abnormal. That is, an acceptable range of response times is established for each type of resource before running the path test. If the actual response time falls outside of this acceptable range, as determined by decision box 143, box 144 is entered where the link with the abnormal response time is identified. If none of the response times are abnormal, as determined by decision box 143, decision box 145 is entered. In decision box 145, it is determined whether there is congestion in any of the resources in the response table. Congestion is detected by noting excessively large transit delays across a particular resource. If congestion is detected in decision box 145, box 146 is entered to identify the transmission link experiencing the congestion. If no congestion is detected in decision box 145, box 147 is entered, representing the successful completion of the path test. Typically, a path test report is prepared, listing the identification of all of the resources in the path, the response times of all of the resources in the path, and the delays through each of the resources in the path. The information made available in boxes 142, 144 and 146 can be used, automatically or by operating personnel, to initiate the establishment of a new path for the transmission of data, the dispatching of repair personnel, and the restricting of the data flow into the network to reduce the congestion or avoid the inoperative or abnormally slow transmission links.

What is claimed is:

1. A packet communications network comprising a plurality of network resources interconnected by transmission links, some of said transmission links being packet switched transmission facilities and some others of said transmission links being circuit switched transmission facilities, means for launching a path test command on said network, said path test command following a preselected path from a source resource in said network to a destination resource in said network, means for returning said path test command from said destination resource to said source resource, means responsive to said path test command for identifying each of said resources along said preselected path, and means for transmitting the identification of said each said resource to said source resource.

2. A packet transmission network according to claim 1 further comprising means in each said resource for identifying the port of said each resource included in said preselected path, and means for transmitting the identification of said port of said each resource included in said preselected path to said source resource.

3. The network according to claim 1 further comprising means in each said resource for identifying the current time, and means for transmitting said current time to said source resource.

4. The network according to claim 1 further comprising means responsive to said identifications of resources at said source resource for determining if responses have been received from all resources in said preselected path.

5. The network according to claim 1 further comprising means for detecting missing path test responses.

6. The network according to claim 1 further comprising means for detecting abnormal response times of said resources.

7. The network according to claim 1 further comprising means for detecting congestion at said resources.

8. The network according to claim 1 further comprising means in each of said network resources for notifying the lowest protocol level in said network resource to initiate a wrap around test to the next resource in said preselected path.

9. The network according to claim 1 further comprising means associated with each of said network resources for changing the protocol of data arriving at said network resource when required for transmission to the next resource in said preselected path, means responsive to said means for changing protocol for launching a new path test command with a changed protocol to said next resource in said preselected path.

10. A method for operating a packet communications network comprising interconnecting a plurality of network resources by transmission links, some of said transmission links being packet switched transmission facilities and some others of said transmission links being circuit switched transmission facilities, launching a path test command on said network, said path test command following a preselected path from a source resource in said network to a destination resource in said network, returning said path test command from said destination resource to said source resource, in response to said path test command, identifying each of said resources along said preselected path, and transmitting the identification of said each said resource to said source resource.

11. The method according to claim 10 further comprising the steps of in each said resource, identifying the port of said each resource included in said preselected path, and transmitting the identification of said port of said each resource included in said preselected path to said source resource.

12. The method according to claim 10 further comprising the steps of in each said resource, identifying the current time, and transmitting said current time to said source resource.

13. The method according to claim 10 further comprising the steps of in response to said identifications of resources at said source resource, determining if responses have been received from all resources in said preselected path.

14. The network according to claim 10 further comprising the step of detecting missing path test responses.

15. The method according to claim 10 further comprising the step of detecting abnormal response times of said resources.

16. The method according to claim 10 further comprising the step of detecting congestion at any of said resource.

17. The method according to claim 10 further comprising the step of in response to the arrival of said path test command at each network resource, notifying the lowest protocol level in said network resource to initiate a wrap around test to the next resource in said preselected path.

18. The method according to claim 10 further comprising the steps of changing the protocol of data arriving at each of said network resources when required for transmission to the next resource in said selected path, and in response to changes in protocol, launching a new path test command with the changed protocol to said next resource in said preselected path.

19. A single physical resource along a particular connection path in a data communications network comprising a plurality of network resources connected by transmission links, comprising means responsive to a path test command arriving on said connection path for generating an identification of said physical resource, and means for transmitting said physical identification of said physical resource back on said connection path, means associated with said physical resource for generating a representation of the current time, and means for transmitting said current time representation back on said connection path.

20. The physical resource according to claim 19 further comprising means associated with said physical resource for generating the identification of the port of said physical resource included in said connection path, and means for transmitting said identification of said port back on said connection path.

21. A single physical resource along a particular connection path in a data communications network having a plurality of network resources connected by transmission links, comprising means responsive to a path test command arriving on said connection path for generating an identification of said physical resource, means for transmitting said physical identification of said physical resource back on said connection path; and means for notifying the lowest protocol level in said physical resource to initiate a wrap around test to the next resource in said connection path.

22. The physical resource according to claim 19 further comprising means for changing the protocol of data arriving at said network resource when required for transmission to the next resource in said connection path, and means responsive to said means for changing protocol for launching a new path test command with a changed protocol to said next resource in said connection path.

23. A method for operating a physical resource in a packet communications network comprising a plurality of network resources interconnected by transmission links, in response to a path test command arriving at said physical resource, generating an identification of said physical resource, and transmitting said identification of said physical resource back on said connection path, generating a representation of the current time, and transmitting said representation of the current time back on said preselected path.

24. The method according to claim 23 further comprising the steps of in each said resource, generating an identification of the port of said physical resource included in said connection path, and transmitting said identification of said port back on said connection path.

25. The method according to claim 23 further comprising the step of in response to the arrival of said path test command at said physical resource, notifying the lowest protocol level in said physical resource to initiate a wrap around test to the next physical resource in said connection path.

26. The method according to claim 23 further comprising the steps of changing the protocol of data arriving at each of said physical resources when required for transmission to the next physical resource in said selected path, and in response to changes in protocol, launching a new path test command with the changed protocol to said next physical resource in said connection path.

* * * * *